Patented June 2, 1942

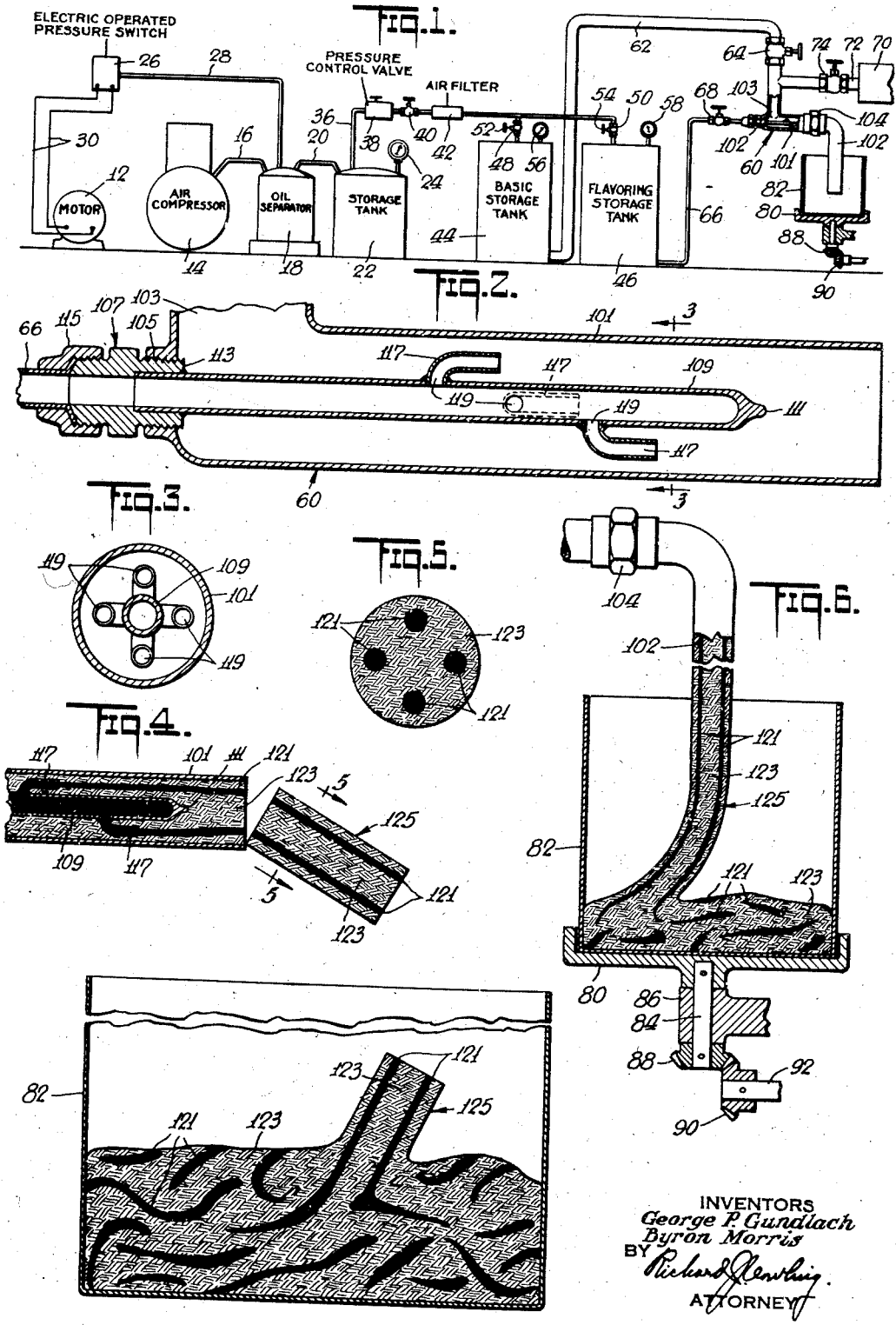

2,284,651

UNITED STATES PATENT OFFICE 2,284,651

METHOD OF AND APPARATUS FOR MAKING A VARIEGATED ICE CREAM OR SIMILAR SUBSTANCE

George P. Gundlach, Cincinnati, Ohio, and Byron Morris, Tuscaloosa, Ala., assignors to Joe Lowe Corporation, New York, N. Y., a corporation of Delaware Application April 10, 1940, Serial No. 328,826

5 Claims. (Cl. 107—54)

The present invention relates generally to a method of and apparatus for making a composite frozen edible product, and it has particular relation to the manufacture of bulk substances, such as sherbet, ice milk, ice cream, frozen custard or like substances, which have variegations of a flavoring material of a contrasting color dispersed therein and therethrough.

An object of the present invention is to provide a new, simple and inexpensive method or process for manufacturing a basic bulk sherbet, ice milk, ice cream, frozen custard or similar substance, having a flavoring material of a contrasting color dispersed therein and therethrough to produce a composite frozen edible variegated product of the character described.

Another object of the invention is the provision of a simple, efficient, and sanitary method or process for manufacturing a basic bulk edible substance, such as sherbet, ice milk, ice cream, frozen custard, or similar substances, having a flavoring material of a contrasting color or colors dispersed therein and therethrough to produce a composite frozen edible variegated product.

A further object of the invention is to provide a new and efficient method of injecting or inserting under pressure continuous spaced strips of a contrasting flavoring consistency into a bulk edible substance of semi-fluid material moving under pressure in the form of a stream.

Another object of the invention is to provide new, simple and inexpensive apparatus suitable for introducing a plurality of spaced strips of a contrasting edible flavoring material into a continuously moving stream of a plastic substance, such as sherbet, ice milk, ice cream, frozen custard or like substances.

Another object of the invention is the provision of a new, simple and inexpensive nozzle for injecting a plurality of streams of a contrasting liquid flavoring material into a moving stream of an edible basic substance, and then extruding the combined substances simultaneously under pressure.

A further object of the invention is to provide new, simple, inexpensive and sanitary apparatus for extruding two substances in a variegated relation from separate sources through a common extruding nozzle by means of a single source of pressure.

A further object of the invention is to provide a simple, efficient and sanitary method of dispersing the composite substances in such a manner that the spaced strips of contrasting edible flavoring material will be broken up and dispersed throughout the basic edible substance to produce a variegated frozen edible product.

Other and further objects and advantages of the invention reside in the detailed description of the method employed and apparatus used, which result in simplicity, economy and efficiency, and which will be apparent from the following description, wherein several preferred forms of embodiment of the invention are diagrammatically shown, reference being had to the accompanying drawings, forming a part hereof, wherein like numerals indicate like parts, in which:

Fig. 1 is a diagrammatic view, partly in section, of apparatus suitable for practicing our invention;

Fig. 2 is an enlarged longitudinal sectional view of the extrusion head shown in Fig. 1;

Fig. 3 is a cross-sectional view of the extrusion head shown in Fig. 2, the same being taken substantially along the line 3—3 thereof, looking in the direction of the arrows;

Fig. 4 is a fragmentary cross-sectional view of the extrusion head shown in Fig. 2, illustrating the manner of extruding the composite edible substances therefrom in a horizontal plane into a receptacle to be filled;

Fig. 5 is a cross-sectional view of the composite extrusion shown in Fig. 4, the same being taken substantially along the line 5—5 thereof; and Fig. 6 is an enlarged vertical sectional view of the filling apparatus shown in Fig. 1, illustrating the manner of filling a container vertically and showing the means for revolving the same during filling to break up the continuity of the flavoring material to prevent separation in said containers before the contents can be frozen to a form-retaining state.

Referring now to the drawing, wherein like numerals indicate like parts, there is shown in Fig. 1 a diagrammatic view of the apparatus employed in carrying out our method for making variegated ice cream and similar substances. In the diagrammatic view of Fig. 1 there is shown an electric motor 12 connected to a source of power (not shown) for driving a conventional air compressor 14, which, in turn, is connected by means of an air line 16 to a conventional oil separator 18 for removing any particles of oil leaking from the compressor 14 into the compressed air in the air line 16. The oil separator 18 is connected by a suitable pipe line 20 to a conventional air storage tank 22, having a standard pressure gauge 24 mounted thereon to provide means for determining the amount of air pressure therein.

The pressure operating mechanism, consisting of the motor 12, air compressor 14 and oil separator 18, are automatically controlled through a conventional combination electric pressure switch 26. The pressure switch 26 is suitably connected to the pressure operating mechanism by means of an air line 28 extending from the oil separator 18 to the air pressure side of the switch 26. The electric side of the pressure switch 26 is suitably connected by wires 30 to the electric motor 12. In this arrangement, which is conventional and comprises no part of our invention except as an air pressure supplying system, the switch 26 causes the motor 12 to operate whenever the air pressure in the oil separator 18, which is identical to the air pressure in the storage tank 22 because of the open air line connection 20 therebetween falls below that pressure at which the switch 26 has been set to operate. In this manner, a constant pressure is maintained in the storage tank 22 for extruding purposes.

An air line 36, containing a pressure control valve 38 of conventional construction, a hand shut-off valve 40 and an air filter 42, connects with a plurality of storage tanks 44 and 46, through suitable intake lines 48 and 50, containing suitable hand shut-off valves 52 and 54. The tanks 44 and 46 are respectively provided with pressure gauges 56 and 58 for determining the exact amount of pressure in said tanks. Since the tanks 44 and 46 are suitably connected to a common source of air pressure means, it will be apparent that the pressure therein for ejecting the contents therefrom will be substantially the same so that when their respective substances are extruded from a common head 60 they will be under substantially equal pressures.

The storage tank 44 may be utilized for receiving a quantity of a semi-frozen semi-plastic basic substance, such as ice cream or similar products from a source, as for example, a batch freezer (not shown). The substance may be inserted in the storage tank 44 through a pipe line or trap door (not shown) when there is no air pressure in the tank, or when the pressure is cut off through the hand operated valve 52.

The storage tank 46 may be utilized for receiving an immiscible flavoring material, such as a chocolate fudge or other flavoring material, in the same manner as the basic substance is placed in the storage tank 44, while the pressure is cut-off through its respective hand operated valve 54.

Leading from the bottom of the storage tank 44, containing the basic substance to the extruding head 60, is a relatively large pipe line 62, which is provided with a manually operable cut-off valve 64 mounted adjacent the end thereof which is connected to said extruding head 60. A relatively small pipe 66 leads from the bottom of the storage tank 46, containing the immiscible syrup or flavoring material, to the extruding head 60. This pipe line 60 is also provided with a manually operable cut-off valve 68 adjacent the end thereof connected to said extruding head.

The apparatus is so designed that the storage tank 44 may be cut-off entirely from the system by means of the valves 52 and 64, and the extruding head 60 connected directly to a conventional continuous freezer 70 through a pipe line 72, containing a manually operable valve 74 for closing off this line and its continuous freezer 70 when a batch freezer operation is desired, and the line 62 from the storage tank 44 is adapted to be used to supply the basic substance to the head 60.

Immediately below the extruding end of the extrusion head 60, we propose to provide a suitable platform 80, for receiving a container 82, such as any size conventional ice cream can, for receiving the composite product to be extruded from the head 60. The platform 80 is suitably mounted on a shaft 84 which, in turn, is mounted in bearing member 85 connected through a series of bevel gears 88 and 90 to a drive shaft 92 connected in any suitable manner to a source of driving power (not shown). We have found that it is essential to keep the container 82 revolving slowly to properly distribute the composite extruded substances in the container 82 and to break up the continuity of the flavoring material to prevent separation due to its increased density over the semi-frozen "over-run" or "agitated" basic substance. If the container is not kept moving slowly during the filling operation, the flavoring substance will all settle to the bottom of the can 82 before the contents thereof can be hardened into a form-retaining state under refrigerating conditions.

As best shown in Fig. 2, the extrusion head 60 consists of an elongated hollow tubular member 101 having a relatively large lateral opening 103 adjacent its receiving end for receiving under pressure a basic edible substance, such as, for example, semi-frozen or semi-plastic ice cream or similar substance in the condition in which it leaves a conventional freezer. As shown in Fig. 1, the opening 103 of the extrusion head 60 may be connected either to a storage pressure tank 44 through a pipe line 62 in the event a batch freezer is employed to whip the basic substance, or it may be connected by means of a pipe line 72 directly to the outlet of a continuous freezer 70 if that type operation is employed to make the basic substances. A delivery pipe 102 may be connected by a suitable coupling 104 to the discharging end of the member 101 to deliver the composite product to the container 82 if a vertical delivery is desired.

The extrusion head 60 is provided also with a relatively small internally threaded axial opening 105, as compared to the relatively large lateral opening 103, adjacent its receiving end for axially receiving concentrically therein an elongated injection nozzle 107 having a discharging chamber 109 provided with a closed forward end 111 adapted to extend for a substantial distance within the member 101 of the extrusion head 60. The receiving end 113 of the injection nozzle 107 is adapted to be threaded into the opening 105 and connected to the pipe line 66 through suitable pipe connections 115 leading to the flavoring storage tank 46.

The discharging chamber 109 of the injection nozzle 107, is provided intermediate its closed end 111 and its receiving end 113, with a plurality of injecting tubes 117 which are adapted to be spaced circumferentially and longitudinally thereover. The injecting tubes 117 are in open communication with the discharging chamber 109 through suitable openings 119. The spacing of the injecting tubes 117 provides that the several streams of flavoring material 121 being forced therefrom under pressure from the tank 46 will be spaced throughout the basic substance 123, as best shown in Fig. 4. By decreasing or increasing the number of injecting tubes 117, the amount and number of strips of flavoring material 121 introduced in the basic substance 123 will be determined.

We believe the operation of the apparatus to cause extrusion of the composite flavoring material 121 and the basic substance 123 with the contrasting flavoring material 121 distributed therethrough in the form of spaced continuous strips or ribbons will be readily understood from the foregoing description so that a repetition of the operation of the entire apparatus need not be herein again set forth. We have found it essential, however, to break up the continuous composite extrusion 125 immediately upon its discharge from the extruding head 60 to prevent actual separation of the flavoring material 121 from the basic substance 123 when it is being deposited in the containers 82. This is necessary because the basic substance 123, being a whipped or agitated product incorporating substantially an equal volume of air, has a density approximately one-half the density of the flavoring material 121, which is not whipped or agitated, and, if the composite product is not broken up immediately, the flavoring material 121 has a tendency to separate out by flowing to the bottom of the container 82. The flavoring material 121 being so dense that any head of material will tend to follow down the continuous path of the strip or ribbon formation to the bottom of the container 82, and to prevent such separation the composite extrusion 125 must be broken up into relatively short lengths, whereby the basic substance 123 will be sufficiently strong to support the flavoring material in the composite mass, and there will be no continuous path or head formation of flavoring material to permit ready separation.

We have found that if we discharge the composite extrusion 125 horizontally, as shown in Fig. 4, it breaks off due to its own weight and gravitational force into relatively short portions, like a sausage, which when deposited into a container 82, will prevent separation of the flavoring material 121 from the basic substance 123. This manner of filling relatively large containers 82 also causes unique distributions of the flavoring material 121 in the basic substance 123, thereby greatly enhancing the appearance of the final product.

If vertical filling of the containers 82 is practiced, as shown in Fig. 6, the continuous extrusion 125 may be broken up by merely revolving the container 82. This operation likewise causes increased distribution of the flavoring material 121 in the basic substance 123, and greatly enhances the appearance of the final product.

Although we have only described in detail several modifications which our invention may assume, it will be readily apparent to those skilled in the art that the same is not so limited, but that various other modifications may be made therein without departing from the spirit thereof or from the scope of the appended claims.

What we claim is:

1. A method of making a bulk composite edible product which comprises bringing a basic edible semi-fluid substance and a contrasting immiscible semi-fluid flavoring material together by means of a common source of pressure, extruding said substances together as a unitary product whereby the flavoring material is distributed throughout the basic substance in a plurality of spaced ribbons or strips, and then breaking up said combined semi-fluid substances into relatively short sections which are discharged or folded over one another to prevent separation from one another in the final product.

2. A method of making a bulk composite frozen edible product which comprises bringing a basic edible semi-fluid substance and a contrasting immiscible semi-fluid flavoring material together under pressure, extruding said combined semi-fluid substances horizontally in a single stream from a common extrusion head with the flavoring material distributed in a plurality of spaced continuous strips in said basic semi-fluid substances, breaking said composite semi-fluid substances into small sections, then discharging said sections one on top of the other to cause non-uniform distribution of the flavoring material and to prevent separation of the same from the basic substance, and freezing the same into a form-retaining state.

3. A method of making a bulk composite frozen edible product which comprises bringing a basic edible semi-fluid substance and a contrasting immiscible semi-fluid flavoring material together under pressure, extruding said substances vertically in a single stream with the flavoring material distributed in a plurality of spaced continuous strips in said basic substance, breaking said stream of combined semi-fluid substances by folding portions over one another to cause non-uniform distribution of the flavoring material and to prevent separation of the same from the basic substance, and freezing the same into a form-retaining state.

4. Apparatus for making a variegated composite edible frozen product consisting of means for delivering a contrasting flavoring material to an extrusion head through which is passing under pressure a stream of semi-plastic basic substance, said extrusion head containing an injection nozzle for delivering a plurality of spaced streams of flavoring material to said basic substance, and means for breaking up said continuous composite stream by causing short portions thereof to be folded over as it is placed into containers to prevent separation of the flavoring material from the basic substance.

5. Apparatus for making a variegated composite edible frozen product consisting of single pressure means for delivering a contrasting flavoring material to an extrusion head through which is passing a stream of semi-plastic basic substance, said extrusion head containing an injection nozzle for delivering a plurality of spaced streams of flavoring material to said basic substance, and revolving means for causing said continuous stream of semi-fluid substances to be folded over upon itself as it is placed into containers to break up the continuous streams of flavoring material to prevent separation thereof from the basic substance before the composite mass is frozen into a form-retaining state.

GEORGE P. GUNDLACH.
BYRON MORRIS.